Figure 1:
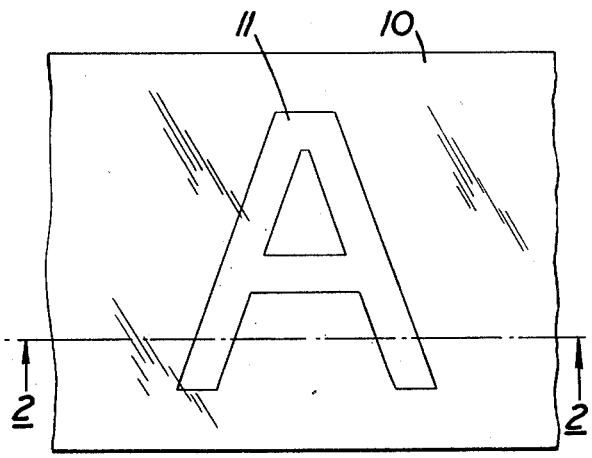

Dec. 23, 1952 R. H. STURM 2,622,991

PROCESS FOR PRINTING ON THERMOPLASTICS

Filed July 29, 1949

Inventor:
Robert Heinrich Sturm,
By: Pierce, Scheffler & Parker,
Attorneys.

Patented Dec. 23, 1952

2,622,991

UNITED STATES PATENT OFFICE 2,622,991

PROCESS FOR PRINTING ON THERMOPLASTICS

Robert Heinrich Sturm, Enfield, England

Application July 29, 1949, Serial No. 107,443
In Great Britain July 30, 1948

2 Claims. (Cl. 117—38)

This invention relates to thermoplastics, more particularly to the production of printed, decorated, coloured or coated sheets of polymerised thermoplastic materials of the acrylic type, that is to say materials comprising esters of acrylic or methacrylic acids, or to the production of composite laminates including one or more layers of such thermoplastic material with a superposed or interposed layer or layers of material which may itself be printed, coloured or coated and which may be of non-plastic character; examples of the materials which may be used are paper, textiles, leather, wood veneers or metal foils.

Much experimental work has been expended upon the problem of applying paint or similar coating layers to thermoplastic materials, but so far there has not been, so far as I am aware, a completely satisfactory method of securing adhesion between this class of material and a wide variety of substances which it is desired to secure thereto. Thus it may be required to apply a decorative pattern to one side of a sheet of such material to provide a decorative surfacing panel, or to use sheets of the material to provide a closely adhering protective layer for signs, notices and other displayed matter.

With the present invention there is provided a process for printing, coating or forming a composite laminate of an acrylic thermoplastic including an ester of acrylic or methacrylic acid, which comprises applying thereto a composition including a partly polymerised ester of acrylic and/or methacrylic acid in a solvent, removing said solvent, and subjecting said materials to heat and pressure to effect substantially complete polymerisation.

An ink or a coating for printing, decorating or laminating acrylic sheets may be prepared in accordance with the invention, by preparing a solution of fully polymerised acrylates such as methyl-, ethyl-, butyl-, or n-hexyl-acrylate together with an appropriate amount of a monomer of the acrylic acid ester or the methyl methacrylic ester. These monomers are catalysed or are partly polymerised before compounding with the solution of polymerised acrylates.

These solutions of acrylates are flexibly and strongly adherent to acrylic sheetings, metal foils, paper, textiles, wood and the like, and can be used as laminating mediums for preparing multiple layers of acrylic sheeting or for attaching materials such as those mentioned above to acrylic sheetings or to form composite laminates thereof.

The acrylic solutions prepared as described can be applied to the acrylic sheeting by printing, roller coating, brushing, spreading or spraying; porous materials such as paper, textiles, wood and the like can also be impregnated with such solutions.

The applied coatings are dried until free of solvents, and the laminates or the sheeting backed or interleaved with paper, textiles, or metal foils as desired are placed between heated platens and a slight pressure applied. The temperature and the pressure are dependent on the softening point of the acrylic coating, which should be made up to lie about 5 to 7° C. below the softening point of the acrylic sheet when fully polymerised.

During the polymerisation process the pressure is gradually increased, corresponding with the increase of the degree of polymerisation of the coating. After being completely polymerised the temperature is gradually decreased to room temperature and the pressure is finally released.

For the purpose of stress-release the laminate is quickly heated to a temperature near the softening point of the acrylic coating and only a slight pressure is applied. Finally it is slowly cooled down again.

EXAMPLE 1

An acrylic coating compound for laminating is prepared as follows:

*(a) Acrylate polymer solution*

| | Parts by weight |
|---|---|
| Poly-ethyl acrylate, molecular weight 15,000 to 16,000 | 40 |
| Xylene | 40 |
| Cyclohexanone | 15 |
| Butyl lactate | 5 |
| | 100 |

*(b) Acrylate monomer solution*

| | Parts by weight |
|---|---|
| Methyl methacrylate, purified | 20 |
| Butyl acetate | 49,20 |
| Tetrahydronaphthalene | 30 |
| Benzoyl peroxide | 0.80 |
| | 100 |

The purified methyl methacrylate monomer, free of water, is partly polymerized in solution in a glass lined or enamelled autoclave fitted with a reflux condenser and stirrer. The autoclave is steam jacketed and provided with a cooling system for better control of the exothermic process of polymerization.

The temperature in the kettle is gradually raised to 85° C. and kept for 45 minutes, then raised to 120° C. for 60 to 135 minutes dependent on the degree of polymerization desired.

For clear coatings the degree of polymerisation is kept higher than for pigmented compounds as the latter have a higher viscosity owing to the pigmented contents.

The viscosity of partly polymerised methyl methacrylate for laminating purposes is preferably 28 seconds determined with a Ford cup viscometer No. 3 at 25° C. For pigmented coatings or printing inks the viscosity is 22 seconds at 25° C.; Ford cup No. 3.

Pigmented coatings or printing inks, also suitable as a laminating medium are prepared by mixing and grinding colour pigments into the acrylate solution (a) and then adding to it the appropriate amount of partly polymerised acrylate.

(c)

| | Parts by weight |
|---|---|
| Acrylate solution (a), clear or pigmented | 60 |
| Partial polymerised methyl methacrylate (b) solution | 40 |
| | 100 |

*Time, heat and pressure schedule for laminates*

| Time, Minutes | Temperature, °C. | Pressure, lb/sq. in. |
|---|---|---|
| 2 | 65 | 150 |
| 5 | 65 | 250 |
| 8 | 65 | 500 |
| 5 | 60 | 500 |
| 3 | 50 | 500 |
| 2 | 30 | |
| 2 | 25 | |
| 3 | 65 | 50 |
| 5 | 25 | 50 |
| 35 | | |

Laminates or composite laminates of acrylic sheetings where the laminating medium is applied as a partial polymer or partial copolymer of acrylates and is fully polymerised in situ as described, behaves as a truly heat fused laminate exhibiting an increased impact strength and resistance to thermal shock as compared to laminates bonded with adhesives in the usual way.

Printing, decorating or coating of single acrylic sheeting is preferably carried out with solutions of polymerised acrylates such as methyl methacrylate, iso-butyl methacrylate, phenyl methacrylate, glycol dimethacrylate together with an appropriate amount of partly polymerised monomer of acrylic acid esters or methyl methacrylic acid esters.

The softening point of such a solution is preferably kept a few degrees above the softening point of the acrylic sheet material.

The acrylic solution or acrylic copolymer solution prepared as above can be pigmented with colouring matters, and are applied to the sheeting by the usual printing or coating methods, and dried until free of solvents.

The printed, decorated or coated sheet is then subjected to a heat and pressure treatment for final polymerisation in a process similar to the laminating process described before, although the temperature is kept nearer to the softening point of the acrylic sheeting (about 2° to 3° C. below the softening point).

The process described results in the printed or decorated surface being completely embedded and heat welded into the acrylic sheeting.

Owing to the higher softening point of the described acrylic compounds there is no tendency of the print or the coating to spread or to distort, and the abrasive resistance of the printed or coated area is increased.

EXAMPLE 2

(d) *Poly-acrylate solution*

| | Parts by weight |
|---|---|
| Poly-cyclohexyl methacrylate, softening point 95° C. | 10 |
| Poly-methyl methacrylate, softening point 90° C. | 30 |
| Xylene | 20 |
| Toluene | 20 |
| Cyclohexanone | 10 |
| Butyl alcohol | 5 |
| Butyl lactate | 5 |
| | 100 |

For pigmented printing inks and coatings such a polyacrylate solution (d) is used as a grinding medium for the colour pigments. As an example for the preparation of a black printing ink 8 parts by weight of a carbon black pigment is finely ground into the acrylate solution (d) and finally blended with a partly polymerised methyl methacrylate solution prepared as described in Example 1(b); the complete formulation is then as follows:

(e)

| | Parts by weight |
|---|---|
| Poly-acrylate solution (d) pigmented with carbon black | 60 |
| Partly polymerised methyl methacrylate solution, Example 1(b) | 40 |

*Time, heat and pressure schedule for heat welded and embedded printings or coatings on plasticised acrylic sheetings*

| Time, Minutes | Temperature, °C. | Pressure, lb/sq. in. |
|---|---|---|
| 10 | 78 | 350 |
| 5 | 65 | 500 |
| 3 | 45 | 500 |
| 2 | 30 | |
| 20 | | |

A further development in printing and coating with prepolymerised acrylic compounds on acrylic sheeting is achieved by fully polymerising such printings or coatings by means of heating in a convection stove or by infra-red heat radiation in the presence of an ultra-violet light source.

By such a treatment the print or coating fully polymerises and sets hard, standing up on the surface of the sheeting. Such a printed or coated surface can be further treated:

(f) By applying the laminating compound as in Example 1 in which case such a print or coating will be embedded and sandwiched between the laminating coating of the sheets forming the laminates after the treatment in a hot press. The advantage of this printing and laminating method is in the low operating coats, using a hot press only once for laminating, and furthermore in the advantage of resulting in an absolutely undistorted print which can be accurately registered especially in a multiple colour print:

(g) By hot pressing the material whereby the surface will become embedded and heat welded into the acrylic sheeting. The advantage in this case is the greater speed of fusing the strongly adherent hard print or coating into the sheeting, using initially a higher temperature and pressure.

The time, heat and pressure schedule for the above described method is as follows:

| Time, Minutes | Temperature, °C. | Pressure, lb/sq. in. |
|---|---|---|
| 6 | 85 | 500 |
| 2 | 50 | 500 |
| 2 | 30 | |
| 10 | | |

If desired, one coating may be used to print upon or decorate the one surface of the sheet, and simultaneously to attach thereto a second sheet of the same material. In this case the second sheet, with or without a further coating of the lower polymer, is applied to the coated surface of the first, and heat and pressure applied as before.

The accompanying drawing shows articles made in accordance with the invention.

Figure 2:

In Figure 1, which is a simple sign, a sheet 10 of acrylic thermoplastic material is shown as carrying a character 11 applied thereto by the process described above. Figure 2 is a cross-section, on the line 2—2 of Figure 1, which indicates that the finished sign is completely fused and heat welded into a unitary structure.

Figure 3:
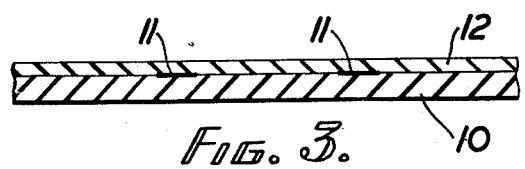

The sign of Figures 1 and 2 can be formed as composite laminate as shown in section in Figure 3. In this figure the sheet 10 having therein the character 11, is shown as being bonded to a further sheet 12.

Figure 4:
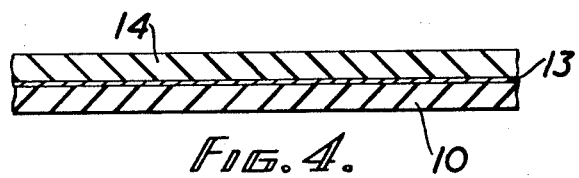

Figure 4 shows a composite laminate having a sheet 10 of acrylic thermoplastic material, a layer 13 of material such as paper, and a further layer 14 of acrylic thermoplastic material.

I claim:

1. A process for printing on a thermoplastic body formed of an ester of an acid of the group consisting of acrylic acid and methacrylic acid, which comprises applying in the form of a print a solution containing a partly polymerized ester of an acid of the group consisting of acrylic acid and methacrylic acid in a volatile solvent mixed with a solution containing a fully polymerized ester of an acid of the group consisting of acrylic acid and methacrylic acid in a volatile solvent, the solution containing the fully polymerized ester having a pigment dispersed therein, the softening points of said partly polymerized ester and said fully polymerized ester being higher than that of said thermoplastic body, evaporating the volatile solvents to leave a dry print on the surface, and subjecting the body with the print thereon to pressure at a temperature about 2 to 3° C. below the softening point of the body whereby the partly polymerized ester is completely polymerized and the print is embedded in the body.

2. A process for forming an embedded print in the surface of a thermoplastic body formed of an ester of an acid of the group consisting of acrylic acid and methacrylic acid, which comprises forming a printing medium by mixing a solution of a pigmented fully polymerized ester of an acid of the group consisting of acrylic acid and methacrylic acid with a solution of a partly polymerized ester of an acid of the group consisting of acrylic acid and methacrylic acid, said fully polymerized ester and said partly polymerized ester having softening points higher than that of said thermoplastic body, applying the printing medium to the surface of the thermoplastic body, evaporating the solvents of said fully polymerized and partly polymerized esters to leave a dry print on the body, softening the thermoplastic body by heating the body to a temperature about 2 to 3° C. below the softening point of the dry print while pressure is applied, gradually increasing the pressure whereby the partly polymerized ester is completely polymerized and embedded in the body, gradually reducing the temperature, releasing completely the pressure, and finally reducing the temperature to room temperature.

ROBERT HEINRICH STURM.

REFERENCES CITED

The following references are of record in the file of this patent:

UNITED STATES PATENTS

| Number | Name | Date |
|---|---|---|
| 2,084,081 | Faber | June 15, 1937 |
| 2,281,100 | Land | Apr. 28, 1942 |
| 2,320,533 | Muskat | June 1, 1943 |
| 2,404,073 | Karfiol | July 16, 1946 |
| 2,458,032 | Simon et al. | Jan. 4, 1949 |
| 2,486,259 | Chavannes | Oct. 25, 1949 |

OTHER REFERENCES

Acrylics Patterned Laminates Plastics, September 1947, page 21.